(12) United States Patent
Uchida

(10) Patent No.: US 7,272,249 B2
(45) Date of Patent: Sep. 18, 2007

(54) FINGERPRINT AUTHENTICATION METHOD, PROGRAM AND DEVICE CAPABLE OF JUDGING INEXPENSIVELY WHETHER INPUT IMAGE IS PROPER OR NOT

(75) Inventor: Kaoru Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 905 days.

(21) Appl. No.: 10/673,621

(22) Filed: Sep. 29, 2003

(65) Prior Publication Data

US 2004/0068669 A1     Apr. 8, 2004

(30) Foreign Application Priority Data

Sep. 27, 2002   (JP)   ............... 2002-283308

(51) Int. Cl.
*G06K 9/00*    (2006.01)
(52) U.S. Cl. .................................. 382/124
(58) Field of Classification Search ........... 382/115, 382/124, 125, 127
See application file for complete search history.

(56) References Cited

U.S. PATENT DOCUMENTS

| 6,301,376 B1 | 10/2001 | Draganoff |
| 7,079,672 B2 * | 7/2006 | Matsumoto et al. ........ 382/125 |

FOREIGN PATENT DOCUMENTS

| DE | 4220971 A1 | 1/1993 |
| DE | 19929671 A1 | 1/2001 |
| EP | 0736 836 A2 | 10/1996 |
| JP | 56-24675 | 3/1981 |
| JP | 4-33065 | 2/1992 |
| JP | 8-110949 | 4/1996 |
| JP | 8-161491 | 6/1996 |
| JP | 9-274656 | 10/1997 |
| JP | 2776757 | 5/1998 |
| JP | 3150126 | 1/2001 |
| JP | 2001-52179 | 2/2001 |
| JP | 2001-266133 | 9/2001 |
| WO | WO 01/55966 A1 | 8/2001 |

OTHER PUBLICATIONS

European Search Report for EP 1403811 A3.*

* cited by examiner

*Primary Examiner*—Colin LaRose
(74) *Attorney, Agent, or Firm*—Scully, Scott, Murphy & Presser, PC

(57) ABSTRACT

A fingerprint authentication device comprises input finger characteristic judging portion 13. The input finger characteristic judging portion 13 judges whether the input data is proper or not on the basis of spatial distribution of brightness in an fingerprint image represented by the input data. An observation line deciding portion decides an observation line on the fingerprint image. A peak envelope calculating portion graphs the brightness against positions on the observation line and draws envelopes of line graphs each of which links local maximums or local minimums of the brightness. A discriminative value calculating portion calculates discriminative values by the use of a brightness distribution function and peak envelop functions. A deciding portion decides whether the input image is proper or not by the use of the discriminative values together with the discriminative coefficient preliminary calculated.

24 Claims, 6 Drawing Sheets

FINGERPRINT AUTHENTICATION METHOD, PROGRAM AND DEVICE CAPABLE OF JUDGING INEXPENSIVELY WHETHER INPUT IMAGE IS PROPER OR NOT

This application claims priority to prior application JP 2002-283308, the disclosure of which is incorporated herein by reference.

BACKGROUND OF THE INVENTION

This invention relates to fingerprint authentication method, program and device.

The fingerprint is a pattern of distinctive epidermal ridges on the bulbs of the inside of the end joints of fingers and thumbs. The fingerprint has uniqueness and immutability. Even if the fingerprint is damaged, undamaged corium under the damaged fingerprint ensures that the fingerprint is regenerated. Therefore, the fingerprint can be used to identify each individual person with a high accuracy.

A fingerprint authentication device is used in a security system for various machines and systems. For instance, the fingerprint authentication device allows a regular or normal user, who is previously enrolled in a computer or an information service system using a computer network, to login the computer or to receive information services from the information service system through the computer network. The fingerprint authentication device uses a fingerprint image provided by a user who intends to login the computer or to receive the information services from the computer network to judge whether the user is a registrant (or the regular user) or not.

A related fingerprint authentication device essentially comprises:

(1) a fingerprint sensor (or a fingerprint input portion) for receiving the fingerprint image provided by the user into this system;
(2) a feature extracting portion for processing input data to extract features of the fingerprint image which are used for collation;
(3) a database for memorizing enrolled data (or template(s)), which are previously produced, about the regular user(s); and
(4) a collating and judging portion for comparing (features of) the input data with (features of) the enrolled data to judge whether the user is the registrant. Such a fingerprint authentication device is disclosed in Japanese Unexamined Patent Publication No. Hei 4-33065.

When there is certain degree of similarity between the features of the input data and the features of the enrolled data, the fingerprint authentication device identifies the user who provided the fingerprint image as the enrolled normal user and allows the user to perform a predetermined operation, such as login a computer.

The fingerprint input portion converts a ridge pattern, which is based on minute concavities (or grooves between ridges) and convexities (or ridges) of a surface of an object (i.e. a finger) placed on the fingerprint sensor, into a digital image data (as the input data). In many cases, the fingerprint input portion includes an optical system. As the optical system, it is known that a method obtains a high contrast image by means of total reflection of a prism. For the method, a photo acceptance device such as a CCD receives light emitted by an LED light source and reflected at an inner side of a reflecting surface of the prism. When a finger of the user is put on an outer side of the reflecting surface of the prism, the concavities and the convexities thereof change reflectance of the reflecting surface. Thus, the photo acceptance device produces the digital image data according to the concavities and the convexities of the finger put on the prism.

In another optical system, light is applied to the finger put on the fingerprint sensor from light sources placed in the vicinity of the fingerprint sensor. The light is scattered at the inside of the finger and a part thereof reaches the fingerprint sensor. The light received by the fingerprint sensor includes difference of strength according to the ridges and grooves of the fingerprint. The fingerprint sensor produces the digital image data on the basis of the strength of the light. Such an optical system is disclosed in Japanese Patent Publication No. 3150126 (P3150126).

The feature extracting portion extracts the features of the fingerprint image represented by the digital image data to collate with features represented by the enrolled data. The enrolled data is also produced by the feature extracting portion previously and memorized in the database.

The collating and judging portion calculates degree of similarity between the features based on the input data and the features based on the enrolled data. Furthermore, the collating and judging portion compares the calculated degree of the similarity with a threshold value. When the calculated degree is larger than or equal to the threshold value, the collating and judging portion judges that the input data and the enrolled data have a common origin. That is, an authentication request is accepted by the fingerprint authentication device. On the other hand, when the calculated degree is smaller than the threshold value, the collating and judging portion judges that the input data and the enrolled data have different origins. That is, the authentication request is rejected by the fingerprint authentication device.

Incidentally, the reason why the authentication request is rejected by the fingerprint authentication device is not clear for the user. The fingerprint authentication device does not accept the authentication request not only when the user is unregistered but also when input of the fingerprint is improper. In other words, when the input data is inappropriate for the authentication, the fingerprint authentication device denies the authentication. Accordingly, an informing system is necessary to inform the user that the input of the fingerprint is improper.

The input of the fingerprint considerably depends on physical relationship between the finger of the user and the fingerprint sensor. There are some systems for deciding whether the physical relationship between the finger of the user and the sensor is correct or not. Such a system is disclosed in each of Japanese Unexamined Patent Publication No. TokkaiHei 8-110949, No. TokkaiHei 8-161491, No. TokkaiHei 9-274656, and No. Tokkai2001-266133 (P2001-266133A).

However, propriety regarding to the input of the fingerprint depends on not only the physical relationship between the finger of the user and the fingerprint sensor but also other things. For example, it is necessary to consider (1): whether outside light unrelated to a light source(s) for the fingerprint sensor exceeds tolerance level or not; and (2): whether an object put on the fingerprint sensor has characteristics suitable for being input or not.

The fingerprint authentication device uses minutiae, such as endpoints and branch points of ridges of the fingerprint image. Accordingly, the fingerprint authentication device tends to mistake (1): when the outside light unrelated to the light source(s) for the fingerprint sensor exceeds the tolerance level; (2): when the object put on the fingerprint sensor does not have the characteristics suitable for being input; and/or (3): when the object is properly put on the fingerprint sensor. Accordingly, the fingerprint authentication device must judges whether the input fingerprint image is proper or not concerning the above mentioned (1), (2) and (3) to obtain a higher accuracy of authentication. If necessary, the fingerprint authentication device must reflect the result of judgment concerning the above mentioned (1), (2) and (3) on the authentication. Alternatively, the fingerprint authentication device must request the user to put the finger on the fingerprint sensor again according to the result of judgment concerning the above mentioned (1), (2) and (3).

To perform the judgment concerning the above mentioned (1), (2) and (3), the fingerprint authentication device is possible to include additional sensors. For instance, an optical power sensor, a conductive sensor and a pressure sensor can be used for the above mentioned (1), (2) and (3), respectively. That is, the optical power sensor can be used to detect background light. The conductive sensor can be used to electric resistance of the object put on the fingerprint sensor. The pressure sensor can be used to pressure provided from the object on the fingerprint sensor. The fingerprint authentication device processes output signals from the additional sensors in parallel to process the input date from the fingerprint sensor. The fingerprint authentication device performs the authentication in a comprehensive manner using processing results of both the output signals from the additional sensors and the input data from the fingerprint sensor.

However, the method using additional sensors has problems that special hardware for the additional sensors is necessary thereby cost increases. Furthermore, the method needs a long time for performing the authentication thereby it lacks convenience.

SUMMARY OF THE INVENTION

It is therefore an object of this invention to provide a fingerprint authentication method capable of judging whether input data is proper or not from various viewpoints by the use of software.

Another object of this invention is to provide a fingerprint authentication method capable of performing fingerprint authentication with high accuracy, at low cast, and at low overhead (or in a short time).

Other objects of this invention will become clear as the description proceeds.

According to a first aspect of this invention, a fingerprint authentication method comprises a first step of collating features of input data based on a fingerprint input by an user with features of enrolled data; a second step of judging whether the input data are proper for authentication or not; and a third step of authenticating the input data according to results of the first step and the second step; wherein the second step is done on the basis of a spatial distribution of brightness in an input image represented by the input data.

For the fingerprint authentication method, the second step comprises a forth step of deciding a observation line on the input image; a fifth step of finding a pair of peak envelopes each of which links local maximums or local minimums on a graph of brightness against positions on the observation line; a sixth step of calculating discriminative values on the basis of the peak envelopes, the discriminative values representing features of the spatial distribution of the brightness; and a seventh step of deciding whether the input data are proper for the authentication or not on the basis of the discriminative values.

According to a second aspect of this invention, a computer readable program makes a computer system serve as a finger authentication device. The computer readable program comprises a first step of collating features of input data based on a fingerprint input by an user with features of enrolled data; a second step of judging whether the input data are proper for authentication or not; and a third step of authenticating the input data according to results of the first step and the second step; wherein the second step is done on the basis of a spatial distribution of brightness in an input image represented by the input data.

For the computer readable program, the second step comprises a forth step of deciding a observation line on the input image; a fifth step of finding a pair of peak envelopes each of which links local maximums or local minimums on a graph of brightness against positions on the observation line; a sixth step of calculating discriminative values on the basis of the peak envelopes, the discriminative values representing features of the spatial distribution of the brightness; and a seventh step of deciding whether the input data are proper for the authentication or not on the basis of the discriminative values.

According to third aspect of this invention, a fingerprint authentication device comprises a collating portion for collating features of input data based on a fingerprint input by an user with features of enrolled data. A characteristic judging portion judges whether the input data are proper for authentication or not. A authenticating portion authenticates the input data according to outputs from the collation portion and the characteristic judging portion. The characteristic judging portion uses a spatial distribution of brightness in an input image represented by the input data to judge whether the input data are proper for authentication or not.

In the fingerprint authentication device, the characteristic judging portion comprises an observation line deciding portion for deciding or setting a observation line on the input image. A peak envelope calculating portion finds a pair of peak envelopes each of which links local maximums or local minimums on a graph of brightness against positions on the observation line. A discriminative value calculating portion calculates discriminative values on the basis of the peak envelopes. The discriminative values represent features of the spatial distribution of the brightness. A deciding portion decides whether the input data are proper for the authentication or not on the basis of the discriminative values.

DESCRIPTION OF THE PREFERRED EMBODIMENT

Referring to FIGS. 1 to 4, description will be made about a fingerprint authentication device according to a first embodiment of this invention.

Figure 1:
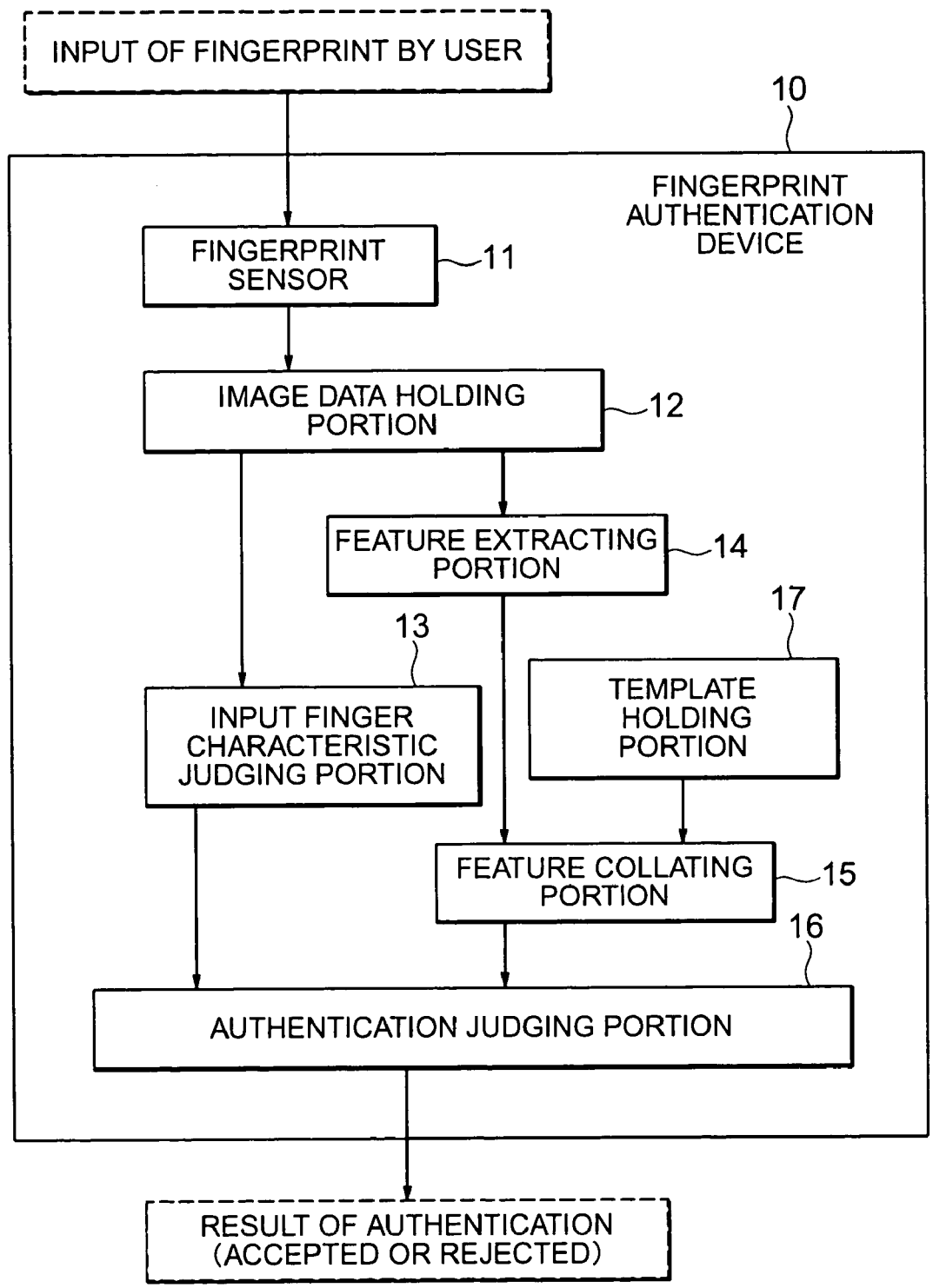
FIG. 1 is a block diagram of a fingerprint authentication device according to a first embodiment of this invention.

In FIG. 1, the fingerprint authentication device 10 comprises a fingerprint sensor 11, a image data holding portion 12, an input finger characteristic judging portion 13, a feature extracting portion 14, a feature collating portion 15, an authentication judging portion 16, and a template holding portion 17.

The fingerprint sensor 11 picks up an image of an object put thereon to produce digital image data. When a user puts her/his finger on the fingerprint sensor 11, the fingerprint sensor 11 picks up a fingerprint image of the finger and changes the fingerprint image into the digital image data representing the fingerprint image. For instance, the fingerprint sensor 11 comprises an optical system including a prism. In the optical system, light emitted by an LED is applied to an inner side of a reflecting surface of the prism. Reflected light reflected at the reflecting surface travels to a CCD. When the finger is put on an outer side of the reflecting surface, areas which are in contact with ridges of the fingerprint are different from other areas which corresponds to grooves of the fingerprint are different from each other in reflectance. Accordingly, the fingerprint image is picked up by the CCD.

Alternatively, the fingerprint sensor 11 may adopt the technique disclosed in the above mentioned Japanese Patent Publication No. 3150126 (P3150126). The disclosure thereof is incorporated herein by reference. In the technique, large number of photo acceptance units are arrayed in two dimensions and have acceptance surfaces covered with a common transparent cover. When the finger is located on the cover and applied with light from the outside, the light is diffusely reflected at the inside of the finger and a part of the light travels toward the acceptance units. Ridges of the fingerprint are in contact with the cover and allow the diffusely reflected light to go in the cover. On the other hand, grooves of the fingerprint are apart from the cover and make nothing for introducing the diffusely reflected light into the cover. That is, most of the diffusely reflected light which goes out from the grooves goes in the ridges or is reflected by the cover. Accordingly, each of the photo acceptance units detects a bright area as a part of the ridges and a dark area as a part of the grooves. Thus, the photo acceptance units can produce the digital image data representing the fingerprint. The digital image data represents brightness values (or pixel values) of two-dimensional arrangement corresponding to two-dimensional pixels (i.e. the photo acceptance units).

The digital image data is supplied from the fingerprint sensor 11 to the image data holding portion 12. The image data holding portion 12 holds or memorizes the digital image data.

The input finger characteristic judging portion 13 uses the digital image data held by the image data holding portion 12 to perform predetermined judgement regarding to input finger characteristics as mentioned later. Briefly the input finger characteristic judging portion 13 produces a characteristic value on the basis of the digital image data and judges whether the characteristic value is within a predetermined range or not. The input finger characteristic judging portion 13 provides a judgement result signal to the authentication judging portion 16.

The feature extracting portion 14 extracts features for fingerprint collation in the feature collating portion 15 from the digital image data read out from the image data holding portion 12.

The template holding portion 17 holds or memorizes enrolled data. The enrolled data represents features which are previously extracted from digital image data provided from a normal or regular user(s).

The feature collating portion 15 calculates degree of similarity between the features extracted by the feature extracting portion 14 and the features represented by the enrolled data of the template holding portion 17. In other words, the feature collating portion 15 produces similarity degree between the fingerprint represented by the digital input image data and the fingerprint represented by the enrolled data.

The feature extracting portion 14 and the feature collating portion 15 may adopt techniques disclosed in the above mentioned Japanese Unexamined Patent Publication No. Hei 4-33065 or in Japanese Unexamined Patent Publication No. Tokkaisyo 56-24675. The disclosures of those are incorporated herein by reference. These techniques use a position (X, Y) of each minutiae (i.e. endpoints or branch points of ridges) in predetermined X-Y coordinates, a direction D of the ridge at the position, and relation numbers. Each of the relation numbers represents the number of ridges between the focused minutia and the nearest minutia nearest from the focused minutia in each of sectors surrounding the focused minutia. For instance, the sectors corresponds quadrants in a local X-Y coordinates which is different from the predetermined X-Y coordinates and has a origin corresponding to the position of the focused minutia. The techniques can stably collate fingerprints with high accuracy by the use of the above mentioned features.

The authentication judging portion 16 receives the judgement result signal from the input finger characteristic judging portion 13 and the similarity degree from the feature collating portion 15. The authentication judging portion 16 judges whether the judgment result shows that the digital image data is proper or not. Furthermore, the authentication judging portion 16 judges whether the similarity degree is more than or equal to a threshold value or not. When the similarity degree is more than or equal to the threshold value, the authentication judging portion 16 judges that the input digital image data is based on the same finger as the base of the enrolled data. Finally, the authentication judging portion 16 accepts the authentication request when the digital image data is proper and the similarity degree is more than or equal to the threshold value. If not so, the authentication judging portion 16 rejects the authentication request.

When the authentication judging portion 16 rejects the authentication request, it may request the user to put the finger on the fingerprint sensor 11 again with discarding the digital image data held in the image data holding portion 12.

Figure 2:
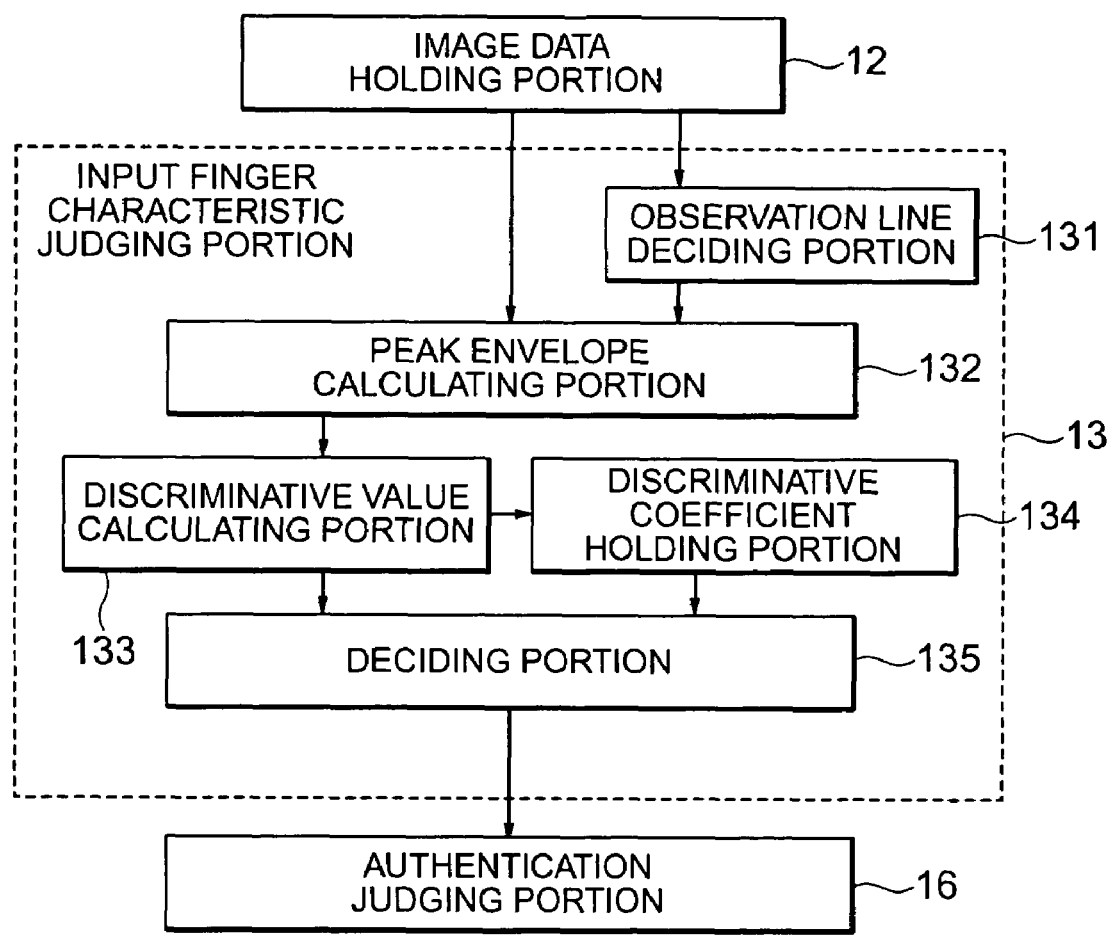
FIG. 2 is a block diagram of an input finger characteristic judging portion included in the fingerprint authentication device of FIG. 1.

Referring to FIGS. 2 and 3, the input finger characteristic judging portion 13 will be described in more detail.

FIG. 2 shows an internal constitution of the input finger characteristic judging portion 13. As shown in FIG. 2, the input finger characteristic judging portion 13 comprises an observation line deciding portion 131, a peak envelope calculating portion 132, a discriminative value calculating portion 133, a discriminative coefficient holding portion 134, and a deciding portion 135.

An operation of the input finger characteristic judging portion 13 will be described in below. Herein, the image data holding portion 12 holds the digital image data which represents the brightness values (or the pixel values) of the two dimensional arrangement corresponding to the two dimensional pixels as mentioned above. Each of the brightness values can take a value within a range from 0 to 255. Larger value of the brightness value signifies more bright while smaller value of the brightness value signifies more dark. That is, the larger value of the brightness value corresponds to the ridges of the fingerprint while the smaller value of the brightness value corresponds to the grooves of the fingerprint.

Figure 3A:
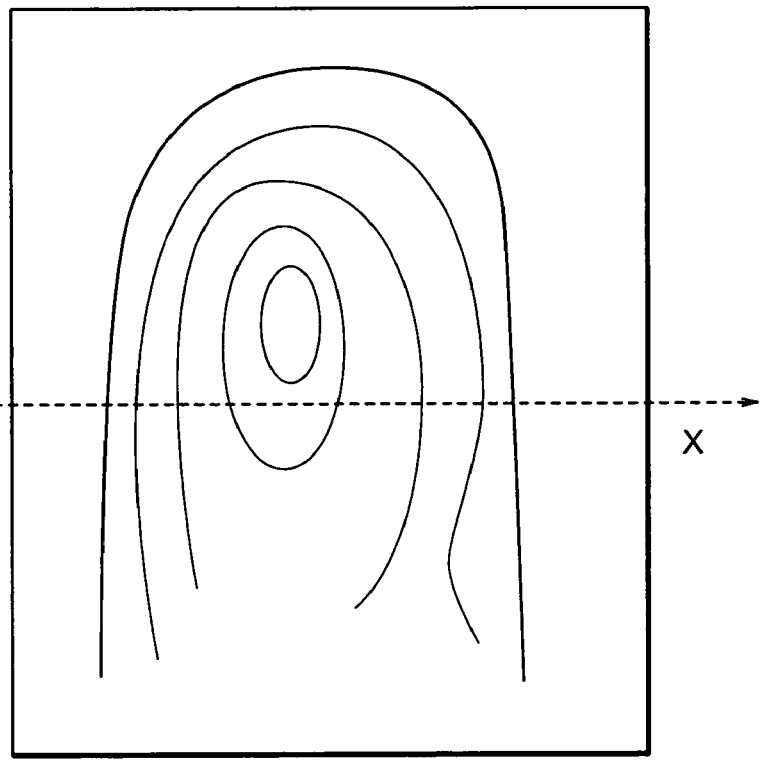
FIG. 3A is a schematic diagram for describing an observation line set on a fingerprint image by an observation line deciding portion included in the input finger characteristic judging portion of FIG. 2.

At first, the observation line deciding portion 131 decides an observation line to set it on the fingerprint image represented by the digital image data as illustrated in FIG. 3A. The observation line comprises a straight line which is parallel to an X direction and passes through an image center of the fingerprint image. The X direction is perpendicular to a Y direction parallel to a longitudinal direction of the finger (or a finger axis). The X and Y directions are used for deciding the observation line and independent of the predetermined X-Y coordinates mentioned above and the local X-Y coordinates mentioned above.

Figure 3B:
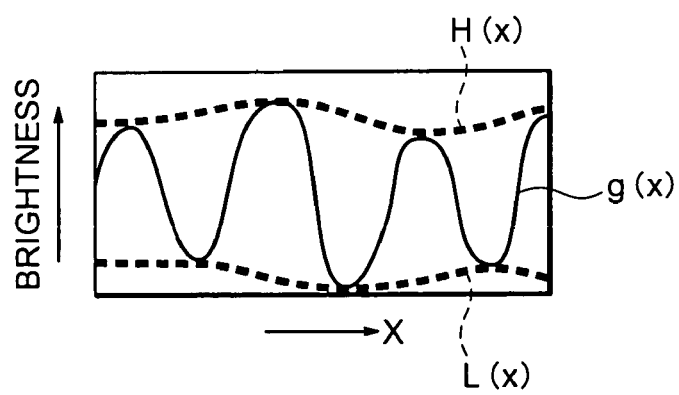
FIG. 3B shows a graph of brightness against positions on the observation line of FIG. 3A and envelops thereof.

The peak envelope calculating portion 132 finds peak envelopes concerning the observation line. The peak envelopes consist of upper and lower envelopes. The upper envelope represents a line graph linking local maximum (or brightest) points in a brightness graph of the brightness value against the positions on the observation line. The lower envelope represents a line graph linking local minimum (or darkest) points in the brightness graph. An example of a combination of the brightness graph and the peak envelopes is illustrated in FIG. 3B. In FIG. 3B, a solid line (or a function g(x)) shows the brightness graph while broken lines (or function H(x) and L(x)) show the peak envelopes. However, the example of FIG. 3B does not derive from the fingerprint image of FIG. 3A.

According to inventor's experiments, a Fourier transformed image of the real-space fingerprint image has clear spots corresponding to a periodic structure of the ridges of the fingerprint when the fingerprint image is properly picked up by the fingerprint sensor 11 (or when the fingerprint image is picked up under the condition that the above mentioned (1), (2) and (3) are met). On the other hand, it is often the case that the Fourier transformed image has no spot or blurred spots when the fingerprint image is improperly picked up by the fingerprint sensor 11 (or when the fingerprint image is picked up under the condition that the above mentioned (1), (2) and/or (3) are not met). The clear spots signify that a sectional surface of the ridges of the fingerprint resembles a sine wave in shape. The shape of the sectional surface corresponds to the brightness graph. The shape of the sectional surface is also referred to as a ridge curve.

Furthermore, according to other inventor's experiments, the peak envelopes have undulation when input of the fingerprint image is properly picked up by the fingerprint sensor 11 under the condition that the above mentioned (1), (2) and (3) are met. On the other hand, it is the often the case that the peak envelopes is in flat curves under the condition that the above mentioned (1), (2) and/or (3) are not met. Therefore, by the use of the ridge curve and the peak envelopes, judging whether the input digital image data is proper or not can be performed.

Actually, the brightness graph of the brightness value against the positions on the observation line has smaller changes except for larger changes corresponding to both of the ridges and the grooves of the fingerprint. The smaller changes are based on smaller irregularities or unevenness on surfaces of the ridges and the grooves of the fingerprint. To obtain the peak envelopes corresponding to the ridges and the groove without influences of the smaller irregularities, the peak envelopes are calculated as follows.

Figure 4:
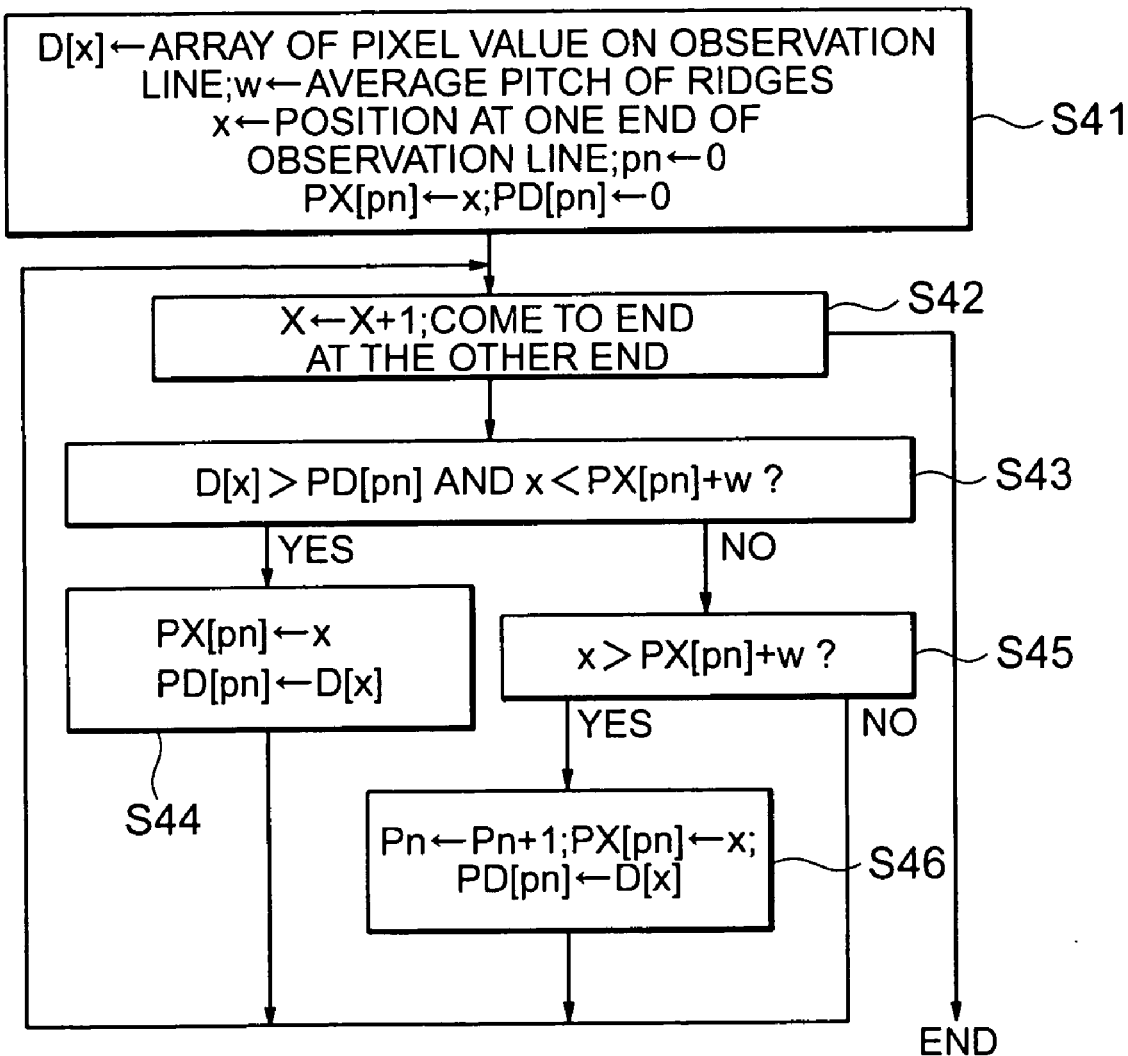
FIG. 4 shows an algorism for describing calculation operation for finding upper one of the envelopes of FIG. 3B.

FIG. 4 shows an algorithm for calculating the upper peak envelope H(x) at the peak envelope calculating portion 132. Here, the position on the observation line is represented by a variable of x while the brightness value at the position x is represented by D[x]. A peak position array of positions of found local maximums is represented by PX[ ] while an peak value array of brightness values of the found local maximums is represented by PD[ ]. The number of found local maximums is represented by pn. A general average pitch of ridges is represented by w. The general average pitch w is decided on the basis of a large number of actual measurement results and resolution of the fingerprint sensor 11. The general average pitch w serves as a supposed standard pitch for the fingerprint image. The last found local maximum has the position represented by PX[pn] and the brightness value represented by PD[pn]. The position PX[pn] and the value PD[pn] are also referred to as the last peak position PX[pn] and the last peak value PD[pn], respectively.

In a step S41, the variable x is set to a value x1 corresponding to the left end position on the observation line. Initial values of "0", "0" and "x1" are given to the number pn, the last peak value PD[pn] and the last peak position PX[pn], respectively.

In a step S42, after the variable x is increased by 1, it is compared with a value x2 corresponding to the right end position on the observation line. Until the variable x becomes equal to the value x2, steps S43-S46 are repeated.

When the variable x is smaller than the value x2, the brightness value D[x] is compared with the last peak value PD[pn] while the variable x is compared with the sum of the last peak position PX[pn] and the average pitch w in the step S43. If the brightness value D[x] is larger than the last peak value PD[pn] and the variable x is smaller than the sum of the last peak position PX[pn] and the average pitch w, the step S43 advances to the step S44. If not so, the step S43 goes to the step S45.

In the step S44, the last peak position PX[pn] and the last peak value PD[pn] are replaced by the variable x and the brightness value D[x], respectively. Then, the step S44 returns to the step S42.

In the step S45, the variable x is compared with the sum of the last peak position PX[pn] and the average pitch w. The variable x is larger than the sum of the last peak position PX[pn] and the average pitch w, the step S45 advances to the step S46. If not so, the step S45 returns to the step S42.

In the step S46, the number pn is increased by 1. This signifies that a new local maximum is found. Furthermore, the last peak position PX[pn] and the last peak value PD[pn] are replaced by the variable x and the brightness value D[x], respectively, like the step S44. Then, the step S46 returns to the step S42.

Thus, the peak position array PX[ ] and the peak value array PX[ ] are found. These arrays represent positions of the local maximums on the brightness graph of the brightness value against the positions on the observation line. The upper peak envelope H(x) is decided by connecting each pair of adjacent two local maximums by a straight line on the brightness graph. The upper peak envelope H(x) takes a form of the line graph as mentioned above.

As for the lower peak envelope L(x), the steps S43 must be replaced as follows. That is, the steps S43 advances to the steps S44 when the brightness value D[x] is smaller than the last peak value PD'[pn] and the variable x is smaller than the sum of the last peak position PX'[pn] and the average pitch w. Here, PD'[ ] represents a peak value array of brightness values of the found local minimums while PX'[ ] represents a peak position array of positions of found local minimums.

The lower peak envelope L(x) is also decided by connecting each pair of adjacent two local minimums by a straight line on the brightness graph. The lower peak envelope L(x) takes a form of the line graph as well as the upper envelope H(x).

Returning to FIG. 2, the upper peak envelope H(x) and the lower peak envelope L(x) are provided to the discriminative value calculating portion 133.

The discriminative value calculating portion 133 calculates the following discriminative values $X_1$, $X_2$, $X_3$, $X_4$ and $X_5$.

The values $X_1$ represents an average of the lower peak envelope L(x). The value $X_1$ is given by:

$$X_1 = \frac{1}{X} \int L(x) dx,$$

where X is the number of the available pixels (mentioned later) on the observation line.

The values $X_2$ represents an average of difference between the brightness g(x) and the lower peak envelope L(x). The value $X_2$ is given by:

$$X_2 = \frac{1}{X} \int (g(x) - L(x)) dx.$$

The value $X_3$ represents an average of averages (or mean values) of the upper peak envelope H(x) and the lower peak envelope L(x). The value $X_3$ is given by:

$$X_3 = \frac{1}{X} \int \frac{H(x) + L(x)}{2} dx.$$

The value $X_4$ represents an average of difference between the upper limit (=255) of the brightness value and the upper peak envelope H(x). The value $X_4$ is given by:

$$X_4 = \frac{1}{X} \int (255 - H(x)) dx.$$

The values $X_5$ represents an average of difference between the brightness g(x) and the upper peak envelope H(x). The value $X_5$ is given by:

$$X_2 = \frac{1}{X} \int (H(x) + g(x)) dx.$$

In each equation, integration is carried out for the available pixels on the observation line. Each of the available pixels has a brightness range wider than a predetermined width. Concretely, the available pixels are corresponding to the positions where difference between the upper peak envelope H(x) and the lower peak envelope L(x) is larger than a predetermined threshold T. For instance, the predetermined threshold T is equal to 40.

The discriminative values $X_1$, $X_2$, $X_3$, $X_4$ and $X_5$ are provided for the deciding portion 135. The deciding portion 135 calculates the characteristic value by the use of the discriminative values $X_1$, $X_2$, $X_3$, $X_4$ and $X_5$ and discriminative coefficients $b_0$, $b_1$, $b_2$, $b_3$, $b_4$ and $b_5$ held by the discriminative coefficient holding portion 134.

The discriminative coefficients $b_0$-$b_5$ are previously produced by the discriminative value calculation portion 133 on a learning phase before the discriminating phase mentioned above.

On the learning phase, digital image data of a large number of fingerprints are used as learning data sets. The learning data sets are classified into two groups. A first group of the learning data sets is obtained under the proper condition while a second group of the learning data sets is obtained under the improper condition. The proper condition is that (1): change of external environment, which includes outer light different from light for the fingerprint sensor 11, is very small; (2) the object located on the fingerprint sensor 11 has characteristics suitable for being input or not; and (3) the object has appropriate physical relationship with the fingerprint sensor 11.

The discriminative value calculation portion 133 calculates the discriminative values $X_1$, $X_2$, $X_3$, $X_4$ and $X_5$ for each of the learning data sets in the same way as mentioned above. Furthermore, the discriminative value calculation portion 133 calculates the discriminative coefficients $b_0$, $b_1$, $b_2$, $b_3$, $b_4$ and $b_5$. That is, the discriminative value calculation portion 133 performs multiple linear regression analysis using a regression equality of:

$$y = b_0 + b_1 X_1 + \ldots + b_5 X_5.$$

Here, target variables of 1 (y=1) and −1 (y=−1) are given for the first group and the second group of the learning data sets, respectively. Thus, the discriminative value calculation portion 133 calculates the discriminative coefficients $b_0$, $b_1$, $b_2$, $b_3$, $b_4$ and $b_5$ and provides them for the discriminative coefficient holding portion 134.

The discriminative coefficient holding portion 134 holds the discriminative coefficients $b_0$, $b_1$, $b_2$, $b_3$, $b_4$ and $b_5$.

On the discriminating phase, the deciding portion 135 calculates y of the above mentioned regression equality as the characteristic value. When the characteristic value is within the predetermined range, the deciding portion 135 judges that the digital image data is proper. On the other hand, when the characteristic value is out of the predetermined range, the deciding portion 135 judges that the digital image data is improper. For instance, the digital image data is proper when the characteristic value is positive while it is improper when the characteristic value is negative.

The deciding portion 135 provides the judgement result signal representing that the digital image data is proper or improper. The authentication judging portion 16 executes the authentication operation using the collation result (or the similarity degree) from the feature collating portion 15 when the judgement result represents that the digital image data is proper. The authentication judging portion 16 accepts the authentication request when the similarity degree is more than or equal to the threshold value. On the other hand, the authentication judging portion 16 does not execute the authentication operation using the collation result when the judgement result represents that the digital image data is improper. The authentication judging portion 16 rejects the authentication request.

Though the learning data sets are classified into two groups in the above description, the learning data sets may be classified into six groups. That is, the learning data sets are classified into two groups according to each of the above mentioned conditions (1), (2) and (3).

In this case, first and second groups classified according to the above mentioned condition (1) are used to calculate a first set of discriminative coefficients $b_0(1)$, $b_1(1)$, $b_2(1)$, $b_3(1)$, $b_4(1)$ and $b_5(1)$. Third and fourth groups classified according to the above mentioned condition (2) are used to calculate a second set of discriminative coefficients $b_0(2)$, $b_1(2)$, $b_2(2)$, $b_3(2, b_4(2$ and $b_5(2)$. Fifth and sixes groups classified according to the above mentioned condition (3) are used to calculate a third set of discriminative coefficients $b_0(3)$, $b_1(3)$, $b_2(3)$, $b_3(3)$, $b_4(3)$ and $b_5(3)$.

To find the discriminative coefficients $b_0(1)$–$b_5(1)$, at first, the discriminative values $X_1$, $X_2$, $X_3$, $X_4$ and $X_5$ are calculated for each of the learning data sets of the first and the second groups. Next, the target variable 1 and −1 are given for the first the second groups, respectively, while the multiple linear regression analysis is carried out by the use of a regression equality of:

$$y^{(1)} = b_0^{(1)} + b_1^{(1)} X_1 + \ldots + b_5^{(1)} X_5.$$

Similarly, the discriminative coefficients $b_0(2)$–$b_5(2)$ and $b_0(3)$–$b_5(3)$ are calculated by the use of the following regression equalities.

$$y^{(2)} = b_0^{(2)} + b_1^{(2)} X_1 + \ldots + b_5^{(2)} X_5$$

$$y^{(3)} = b_0^{(3)} + b_1^{(3)} X_1 + \ldots + b_5^{(3)} X_5$$

On the discriminating phase, the digital input image data for the authentication are used to calculate the discriminative values $X_1$, $X_2$, $X_3$, $X_4$ and $X_5$. Furthermore, preliminary characteristic values of y(1), y(2) and y(3) are calculated by the use of the discriminative values $X_1$-$X_5$ and the discriminative coefficients $b_0(1)$–$b_5(1)$, $b_0(2)$–$b_5(2)$ and $b_0$ (3)–$b_5$ (3). If all of the preliminary characteristic values y(1), y(2) and y(3) are within the predetermined range (e.g. positive), the digital input image data can be regarded as being picked up appropriately. Accordingly, the minimum of the preliminary characteristic values y(1), y(2) and y(3) is selected as the eventual characteristic value in this case. That is, the deciding portion 135 of the input finger characteristic judging portion 13 judges whether the digital image data is proper or not on the basis of the eventual characteristic value.

Referring to FIGS. 5 and 6A-6C, the description will proceed to an input finger characteristic judging portion 13' according to a second embodiment of this invention.

Figure 5:
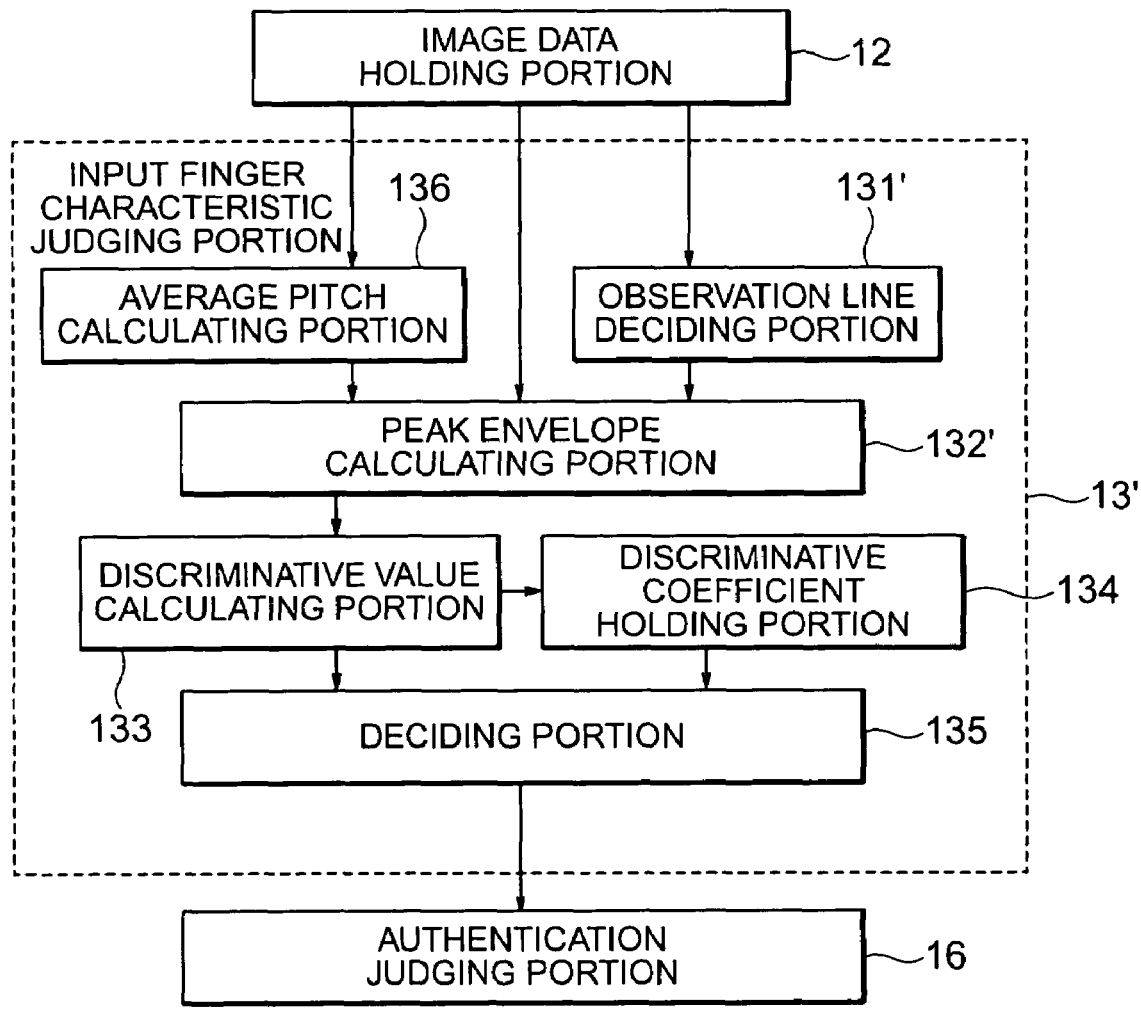
FIG. 5 is an input finger calculating portion 13' according to a second embodiment of this invention.

As illustrated in FIG. 5, the input finger characteristic judging portion 13' comprises an average pitch calculating portion 136 in addition to the structure of the input finger characteristic judging portion 13 shown in FIG. 2. The observation line deciding portion 131' and the peak envelope calculating portion 132' are different from the observation line deciding portion 131 and the peak envelope calculating portion 132 of FIG. 2, respectively, in operation. The input finger characteristic judging portion 13' is used in the fingerprint authentication device of FIG. 1 as a substitute for the input finger characteristic judging portion 13.

The observation line deciding portion 131' finds a fingerprint center and a fingertip direction. The fingerprint center is referred to as a core. The fingertip direction points in a direction of a fingertip of a fingerprint image represented by the digital image data (or two dimensional array data) held in the image data holding portion 12.

The fingerprint center can be found by a known manner. The fingertip direction can be found by, for example, a technique described in Japanese Patent Publication No. 2776757. The disclosure thereof is incorporated herein by reference. In this technique, it is assumed that radial vectors and ridge vectors have a unit length. The radial vectors are radially oriented from the fingerprint center and located apart from the fingerprint center. In addition, the radial vectors are located at predetermined (e.g. regular) intervals in the peripheral direction. Each of the ridge vectors has an initial point in common with any one of the radial vectors. Each of the ridge vectors is parallel to a ridge direction at the initial point. The ridge direction can be found by a know manner. Inner products of the radial vectors and the ridge vectors are calculated. A sequence of the inner products in an order according to the peripheral direction has a pattern. The fingertip direction can be decided by comparing the pattern with a pattern dictionary which is previously constructed. This is because the ridge direction and the radial direction are collated. If a certain radial vector is parallel to the fingertip direction, an inner product with regard to the radial vector is the minimum (or local minimum) value.

Figure 6A:
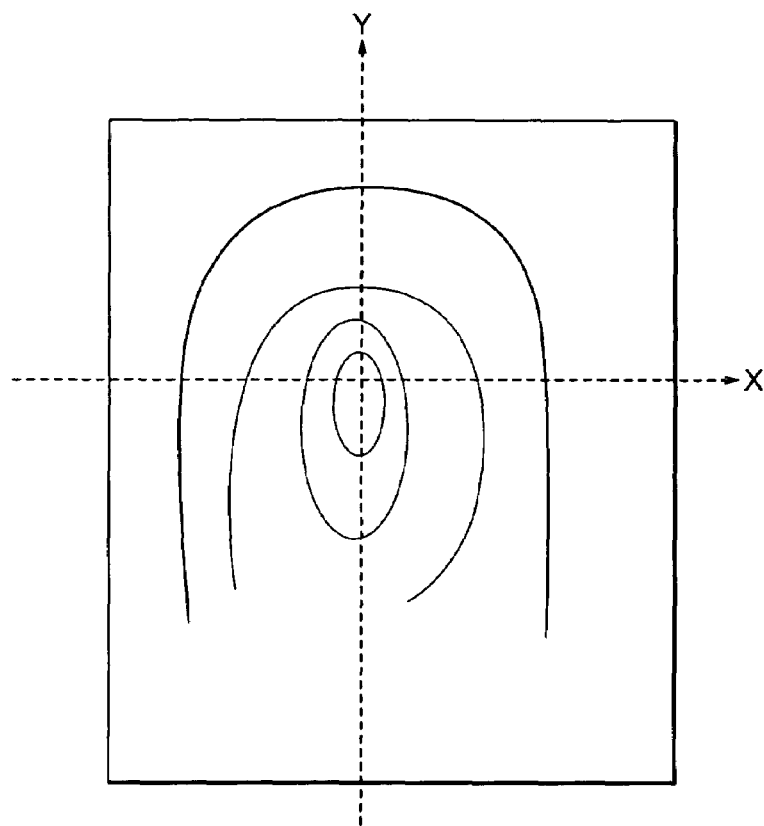
FIG. 6A is a schematic diagram for describing observation lines which are perpendicular to each other and set on a fingerprint image by an observation line deciding portion included in the input finger characteristic judging portion of FIG. 5.

The observation line deciding portion 131' decides two observation lines on the basis of the fingerprint center and the fingertip direction. That is, one of the observation lines is parallel to the fingertip direction and passes through the fingerprint center while the other is perpendicular to the fingertip direction and passes through the fingerprint center. X and Y axes are decided to be parallel to the observation lines. An example of the observation lines set on the fingerprint image is illustrated in FIG. 6A.

The average pitch calculating portion 136 calculates an individual average pitch of ridges according to the digital image data held in the image data holding portion 12. The individual average pitch is used as a substitute for the general average pitch w of the first embodiment. This is because of variety of individual average pitches among individuals. For example, the individual average pitches depend on gender of the owner of the fingerprint represented by the digital image data, age thereof, and so on. Accordingly, using the individual average pitch for each fingerprint image enhances accuracy of deciding peak envelopes as compared with a case using the general average pitch w. To find the individual average pitch, the average pitch calculating portion 136 decides a plurality of square areas on the fingerprint image. When the fingerprint sensor has 512×512 pixels, each of square areas has 128×128 pixels, for example. The average pitch calculating portion 136 performs frequency analysis for each of the square areas. The average pitch calculating portion 136 calculates preliminary average pitches each of which corresponding to a peak in the frequency domain for each square area. Finally, the average pitch calculating portion 136 calculates the average of the preliminary average pitches as the individual average pitch.

Figure 6B:
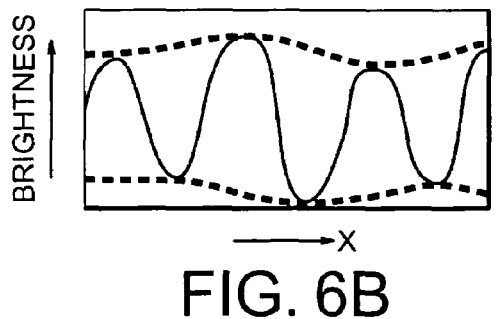
FIG. 6B shows a graph of brightness against positions on one of the observation lines of FIG. 6A and envelops thereof.
Figure 6C:
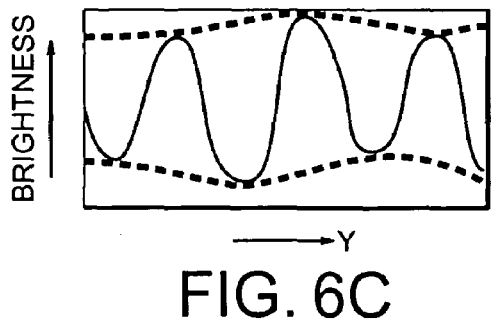
FIG. 6C shows a graph of brightness against positions on the other of the observation lines of FIG. 6B and envelops thereof.

The peak envelop calculating portion 132' calculates peak envelops with regard to each of the observation lines in a manner similar to the first embodiment. However, the individual average pitch calculated by the average pitch calculating portion 136 is used as a substitute for the general average pitch w to calculate the peak envelops. Examples of the peak envelopes are illustrated in FIGS. 6B and 6C related to observation lines parallel in the X and Y direction. The peak envelopes are given as line graphs each of which links local maximums or local minimums of the brightness values against positions on each observation line.

The discriminative value calculating portion 133 calculates the discriminative values related to each observation line in a manner similar to the first embodiment. That is, the discriminative value calculating portion 133 finds two sets of the discriminative values corresponding to the two observation lines.

In a learning phase, the discriminative value calculating portion 133 further calculates the discriminative coefficients related to each observation line in a manner similar to the first embodiment. That is, the discriminative value calculating portion 133 finds two sets of the discriminative coefficients corresponding to the two observation lines. The discriminative coefficients are memorized in the discriminative coefficient holding portion 134.

In a discriminating phase, the deciding portion 135 calculates two preliminary characteristic values corresponding to the two observation lines by the use of the two set of the discriminative values and the two sets of the discriminative coefficients in a manner similar to the first embodiment. The deciding portion 135 selects smaller one of the preliminary characteristic values as the eventual characteristic value to judge whether the fingerprint image is proper or not. When the eventual characteristic is, for example, positive, the deciding portion 135 decides that the fingerprint image is proper. When the eventual characteristic is negative, the deciding portion 135 decides that the fingerprint image is improper. The deciding portion 135 provides the judging result to the authentication judging portion 16.

The authentication judging portion 16, as mentioned above, performs the fingerprint authentication using the judging result from the input finger characteristic judging portion 13' and the similarity degree from the feature collating portion 14. The authentication judging portion 16 accepts the authentication request when the judging result shows that the fingerprint image is proper and when the similarity degree is more than or equal to the threshold value. If not so, the authentication judging portion 16 rejects the authentication request.

When the authentication judging portion 16 rejects the authentication request, it may request the user to put the finger on the fingerprint sensor 11 again with discarding the digital image data held in the image data holding portion 12.

In above mentioned embodiments, like the feature extracting portion 14, the feature collating portion 15 and authentication judging portion 16, the input finger characteristic judging portion 13 (13') is provided as a form of a computer program (or software). In other words, the input finger characteristic judging portion 13 (13') is substantiated by execution of the computer program in a computer system. The computer system serves as the fingerprint authentication device 10.

According to the above mentioned embodiments, it is carried out by software processing (1) whether change of external environment, which includes outer light different from light for the fingerprint sensor 11, is smaller than the maximum permissible level or not; (2) whether the object located on the fingerprint sensor 11 has characteristics suitable for being input or not; and (3) whether the object has appropriate physical relationship with the fingerprint sensor 11 or not. Thus, it is unnecessary to provide special hardware for the above mentioned judgements. Therefore, the fingerprint authentication device has two advantages of high accuracy of fingerprint authentication and low cost.

Furthermore, the fingerprint authentication device uses one or two observation lines to carry out the above mentioned judgements. Thus, a small amount of calculation is necessary for the above mentioned judgements in comparison with a case where all of the digital image data are used. Therefore, it is unnecessary to enhance throughput of the fingerprint authentication device. In other words, processing time required for the fingerprint authentication is hardly increased by the above mentioned judgements.

While this invention has thus far been described in conjunction with the few embodiments thereof, it will readily be possible for those skilled in the art to put this invention into practice in various other manners.

For example, the input finger characteristic judging portion 13 (or 13') may provide the (eventual) characteristic value to the authentication judging portion 16. In this case, the judging whether the fingerprint is proper or not is executed by the authentication judging portion 16.

What is claimed is:

1. A fingerprint authentication method comprising,
    a first step of collating features of input data based on a fingerprint input by a user with features of enrolled data;
    a second step of judging whether the input data are proper for authentication or not, said judging comprising deciding an observation line on an input image; finding a pair of peak envelopes each of which links local maximums or local minimums on a graph of brightness against positions on the observation line; calculating discriminative values on the basis of the peak envelopes, said discriminative values representing features of the spatial distribution of the brightness; and deciding whether the input data are proper for the authentication or not on the basis of the discriminative values; and
    a third step of authenticating the input data according to results of said first step and said second step; wherein said second step is done on the basis of a spatial distribution of brightness in the input image represented by the input data.

2. A fingerprint authentication method as claimed in claim 1, wherein said deciding whether the input data are proper is done using one or more discriminants and corresponding discriminative coefficients which are previously calculated.

3. A fingerprint authentication method as claimed in claim 1, wherein said deciding an observation line on the input image comprises:
    finding a fingerprint center and a fingertip direction on the input image; and
    assuming two imaginary lines on the input image, one of said imaginary lines being parallel to the fingertip direction and used as the observation line, the other of said imaginary lines being perpendicular to the fingertip direction and used for another observation line.

4. A fingerprint authentication method as claimed in claim 1, wherein said finding the pair of peak envelopes is done on the condition that a distance between adjacent local maximums or adjacent local minimums is larger than a predetermined distance.

5. A fingerprint authentication method as claimed in claim 4, wherein said predetermined distance is corresponding to an average ridge interval of a large number of samples.

6. A fingerprint authentication method as claimed in claim 4, wherein said predetermined distance is corresponding to an average ridge interval calculated by applying Fourier transformation to a plurality of areas of the input image.

7. A fingerprint authentication method as claimed in claim 1, wherein said calculating discriminative values is done on the basis of a spatial distribution function representing brightness against positions on the observation line, peak envelope functions representing said peak envelopes.

8. A fingerprint authentication method as claimed in claim 1, further comprising:
   requesting the user to input the fingerprint once more when deciding whether the input data are proper decides the input data are not proper.

9. A computer readable program, stored on a computer readable medium, generating instructions to perform the following, comprising:
   a first instruction for collating features of input data based on a fingerprint input by a user with features of enrolled data:
   a second instruction for judging whether the input data are proper for authentication or not, said judging comprising deciding an observation line on an input image; finding a pair of peak envelopes each of which links local maximums or local minimums on a graph of brightness against positions on the observation line; calculating discriminative values on the basis of the peak envelopes, said discriminative values representing features of the spatial distribution of the brightness; and deciding whether the input data are proper for the authentication or not on the basis of the discriminative values; and
   a third instruction for authenticating the input data according to results of said first instruction and said second instruction; wherein
   said second instruction is done on the basis of a spatial distribution of brightness in the input image represented by the input data.

10. A computer readable program as claimed in claim 9, wherein said deciding whether the input data are proper is done using one or more discriminants and corresponding discriminative coefficients which are previously calculated.

11. A computer readable program as claimed in claim 9, wherein said deciding an observation line comprises:
   finding a fingerprint center and a fingertip direction on the input image; and
   assuming two imaginary lines on the input image, one of said imaginary lines being parallel to the fingertip direction and used as the observation line, the other of said imaginary lines being perpendicular to the fingertip direction and used for another observation line.

12. A computer readable program as claimed in claim 9, wherein said finding the pair of peak envelopes is done on the condition that a distance between adjacent local maximums or adjacent local minimums is larger than a predetermined distance.

13. A computer readable program as claimed in claim 12, wherein said predetermined distance is corresponding to an average ridge interval of a large number of samples.

14. A computer readable program as claimed in claim 12, wherein said predetermined distance is corresponding to an average ridge interval calculated by applying Fourier transformation to a plurality of areas of the input image.

15. A computer readable program as claimed in claim 9, wherein said calculating discriminative values is done on the basis of a spatial distribution function representing brightness against positions on the observation line, peak envelope functions representing said peak envelopes.

16. A computer readable program as claimed in claim 9, further comprising: requesting the user to input the fingerprint once more when deciding whether the input data are proper decides the input data are not proper.

17. A fingerprint authentication device:
   a collating portion for collating features of input data based on a fingerprint input by a user with features of enrolled data:
   a characteristic judging portion for judging in whether the input data are proper for authentication or not, comprising:
      an observation line deciding portion for deciding an observation line on an input image;
      a peak envelope calculating portion for finding a pair of peak envelopes each of which links local maximums or local minimums on a graph of brightness against positions on the observation line;
      a discriminative value calculating portion for calculating discriminative values on the basis of the peak envelopes, said discriminative values representing features of the spatial distribution of the brightness; and
      a deciding portion for deciding whether the input data are proper for the authentication or not on the basis of the discriminative values; and
   an authenticating portion for authenticating the input data according to outputs from said collation portion and said characteristic judging portion; wherein
   said characteristic judging portion uses a spatial distribution of brightness in the input image represented by the input data to judge whether the input data are proper for authentication or not.

18. A fingerprint authentication device as claimed in claim 17, further comprises a discriminative coefficient holding portion for holding one or more discriminants and corresponding discriminative coefficients which are previously calculated by the use of said discriminants, wherein
   said deciding portion uses said discriminants and said discriminative coefficients together with the discriminative values to decide whether the input data are proper for the authentication or not.

19. A fingerprint authentication device as claimed in claim 17, wherein said observation line deciding portion executes of the steps of:
   finding a fingerprint center and a fingertip direction on the input image; and
   assuming two imaginary lines on the input image, one of said imaginary lines being parallel to the fingertip direction and used as the observation line, the other of said imaginary lines being perpendicular to the fingertip direction and used for another observation line.

20. A fingerprint authentication device as claimed in claim 17, wherein said peak envelope calculating portion adopts a condition that a distance between adjacent local maximums or adjacent local minimums is larger than a predetermined distance.

21. A fingerprint authentication device as claimed in claim 20, wherein said predetermined distance is corresponding to an average ridge interval of a large number of samples.

22. A fingerprint authentication device as claimed in claim 20, wherein said predetermined distance is corresponding to an average ridge interval calculated by applying Fourier transformation to a plurality of areas of the input image.

23. A fingerprint authentication device as claimed in claim 17, wherein a discriminative value calculating portion calculates the discriminative values by the use of a spatial distribution function representing brightness against positions on the observation line, peak envelope functions representing said peak envelopes.

24. A fingerprint authentication device as claimed in claim 17, wherein said authenticating portion requests the user to input the fingerprint once more when the input data are not proper.

* * * * *